United States Patent [19]

Hotger

[11] Patent Number: 4,541,607
[45] Date of Patent: Sep. 17, 1985

[54] HIGH-PRESSURE BALL VALVE

[75] Inventor: Karl Hotger, Bochum, Fed. Rep. of Germany

[73] Assignee: Gebr. Eickhoff Maschinenfabrik und Eisengiesserei m.b.H., Bochum, Fed. Rep. of Germany

[21] Appl. No.: 656,318

[22] Filed: Oct. 1, 1984

[30] Foreign Application Priority Data

Oct. 6, 1983 [DE] Fed. Rep. of Germany ....... 3336345

[51] Int. Cl.$^4$ .......................................... F16K 31/122
[52] U.S. Cl. .............................. 251/63.4; 137/DIG. 2; 251/62
[58] Field of Search ................ 137/DIG. 2; 251/63.4, 251/62

[56] References Cited

U.S. PATENT DOCUMENTS

| 1,042,151 | 10/1912 | Schnicke | 137/DIG. 2 |
| 1,831,404 | 11/1931 | Ayers | 251/63.4 |
| 1,959,336 | 5/1934 | Bast et al. | 137/DIG. 2 |
| 4,457,340 | 7/1984 | Krueger | 137/DIG. 2 |

Primary Examiner—Arnold Rosenthal
Attorney, Agent, or Firm—Thomas H. Murray; Clifford A. Poff

[57] ABSTRACT

A high-pressure ball valve includes a valve housing with a bore that sealingly receives a cylindrical extension of a valve member. An inlet bore extending to the bore in the valve housing has a bottom seat against which a ball can seal off the inlet bore. The cylindrical extension has a pocket to receive the ball while engaging a stem that extends through a bore in the valve member against a piston of a single-acting piston and cylinder assembly. An outlet bore extends in the valve housing to the bore therein for delivering the fluid passing into the housing from the outlet bore.

6 Claims, 3 Drawing Figures

HIGH-PRESSURE BALL VALVE

BACKGROUND OF THE INVENTION

This invention relates to a high-pressure ball valve which includes a housing having a valve bore communicating with an outlet bore at the periphery thereof and an inlet bore having a seat surface facing the valve bore; and a valve member formed with a bore receives a stem mounted for actuation by a hydraulically-actuated piston to move and hold a ball against the seat surface for closing the inlet bore.

In West German patent publication No. DE-OS 29 47 551, there is disclosed a high-pressure valve including a housing formed with an inlet and an outlet and a valve member displaceable between the inlet and outlet by means of a drive. The valve member is guided in a ball cage and is constructed as a ball adapted to be lifted from a seat surface therefor against fluid pressure by a valve stem connected to the drive. The stem is guided in a cylindrical bore extending from the valve seat. Axial recesses in the cylindrical periphery of the valve stem allow the fluid medium to pass to a housing chamber. An axial extension of the valve stem merges into a piston rod which includes a piston that can slide in a cylindrical bore in the valve housing. A hydraulic, pneumatic or electric drive reciprocates the piston in the cylindrical bore at a required frequency to open and close the valve at that frequency.

SUMMARY OF THE INVENTION

It is an obJect of the present invention to provide a high-pressure ball valve embodying a simplified and advantageous construction of parts and adapted to be controlled by pressurized fluid.

More particularly, the present invention provides a high-pressure ball valve comprising the combination of a valve housing having a valve bore formed with an outlet bore at the periphery thereof, the valve bore extending to an inlet bore having a seat surface facing the valve bore, a valve member including a cylindrical extension extending from tapered and substantially frusto-conical end face, the cylindrical extension having a length to sealingly engage in the valve bore and extend to an outlet bore at the periphery thereof, the cylindrical extension further having a central bore extending to an enlarged pocket within the extended end thereof, a ball to sealingly fit in the enlarged pocket against the central bore therein opposite the seat surface of the inlet bore, a stem received in the central bore of the cylindrical extension for displacing the ball from the pocket against the seat surface of the inlet bore, and a hydraulically-actuated piston for displacing the stem along the bore in the valve member.

The construction of parts for the high-pressure ball valve of the present invention is surprisingly simple and provides practically trouble-proof and reliable operation even at maximum operating pressures. The valve housing bore is shut off solely by means of the valve member which engages by a close tolerance extension in a correspondingly dimensioned bore of the valve housing. The slightly frusto-conical tapering end face of the valve member can be pressed by a small bearing surface against the valve housing under a large force in the immediate area of the bore in the valve housing. This feature, together with the long seat surface provided on the extension of the valve member which engages in the bore, provide a hermetic seal for the valve housing. Such a seal is obtained with a minimum of cost for structure and operable even at maximum pressures. The ball used to seal off the inlet bore of the valve housing also performs the task of shutting off the stem-receiving bore by sealingly engaging in the pocket or enlarged part of the bore, and further by the pressure of the flowing medium acting on the top surface of the ball forcing it into the pocket. All of the bores in the valve housing and the valve member have plain walls so that there is no risk of notch stresses which considerably reduce the life of such valves, particularly under the influence of rhythmic high-pressure surges.

According to a further feature of the present invention, the side of the valve member which is remote to the extension engages a cylinder which is disposed coaxially of the extension. The cylinder receives the piston and the parts are arranged so that fluid pressure acts only on the side of the piston which is remote from the valve member. On the other side of the piston, the cylinder forms a chamber into which the stem projects and communicates with an outlet aperture. The pressure medium actuates the piston to hold the ball in its closed position by way of the stem. The pressure medium releases the ball only when the piston moves to an unactuated position. The surface of the piston acted upon by the pressurized fluid medium is a multiple of the ball surface which is subject to the high pressure of the medium controlled by the valve, whereby the pressure needed to actuate the piston can be much lower than the pressure of the medium controlled by the valve. Any medium passing through the bore of the valve member is received in the area surrounded by the cylinder and discharged through the outlet aperture communicating therewith without obstructing movement of the piston used to displace the stem.

Advantageously, a collar on the valve member engages in the bore of the cylinder which is connected to the valve housing by means of clamp bolts that extend to a cover for the cylinder. In this way the cover, cylinder and valve member are all interconnected and connected to the valve housing to form a single compact component, thereby reducing the manufacturing cost and simplifying the assembly of the valve.

The present invention avoids the use of screw threads in the valve housing as far as possible because they create impact stresses which weaken the valve housing. A feature of the present invention is characterized by extending the clamp bolts freely through bores in the valve housing to engage with threaded bores disposed in a ring that, in turn, engages the side of the valve housing which is opposite the cylinder. The ring is arranged to enclose the valve inlet port.

The end face of the piston which is not subject to actuation by pressurized fluid is provided with a hard metal insert situated centrally to engage the stem. The opposite end of the stem may be of reduced diameter to engage with the ball. This construction of parts prevents deflection of the piston end face which is not subject to pressure of the actuating fluid medium. The construction also prevents the stem end, which is subjected to high loading by the ball, from damaging the valve member bore portion constricted down to the diameter of the stem, such damage may be due to a permanent deformation of the stem end.

Advantageously, the length of the reduced diameter at the end of the stem is such that a shoulder produced thereby is situated within the bore of the valve body surrounding the stem even when the ball is at a bottom dead-center position. This obviates damage to the stem surface because the top seat for the ball undergoes deformation in the course of time due to the high-fluid pressure and the resulting burr projects to a varying degree into the bore portion containing the stem.

These features and advantages of the present invention as well as others will be more fully understood when the following description is read in light of the accompanying drawings, in which.

Figure 2:
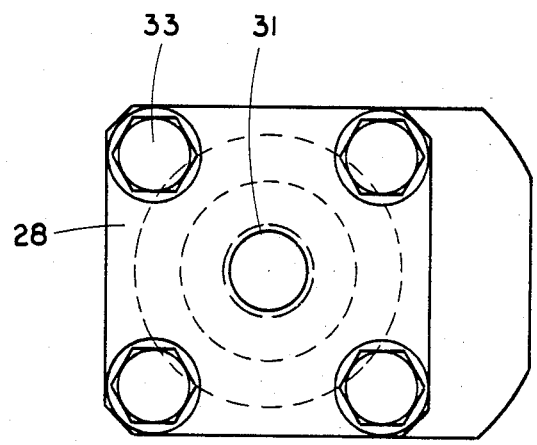
FIG. 2 is a plan view of the valve shown in FIG. 1.
Figure 1:
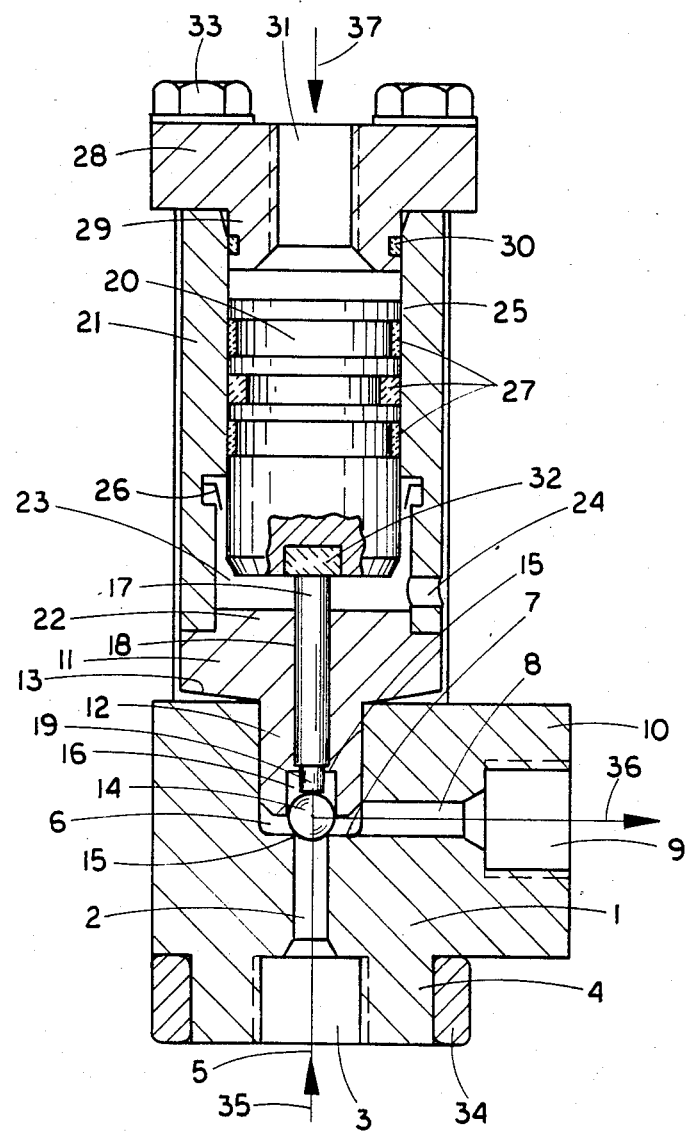
FIG. 1 is an elevational view, in section, through a high-pressure ball valve embodying the features of the present invention.
Figure 3:
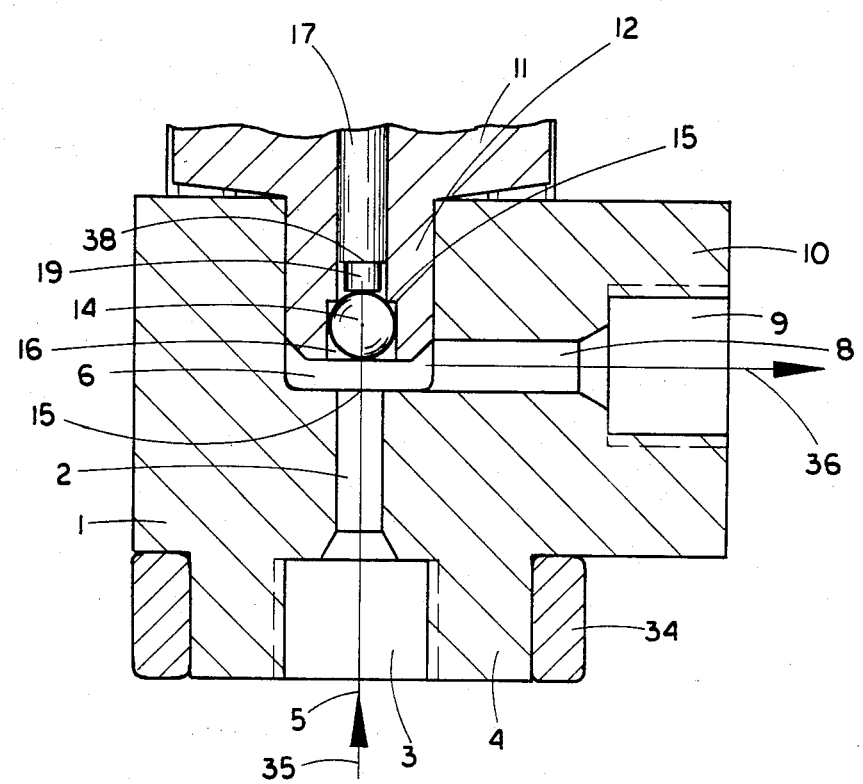
FIG. 3 is an enlarged view illustrating part of the valve shown in FIG. 1.

In FIGS. 1-3, there is illustrated a valve housing 1 formed with an inlet bore 2 extending from a larger diameter, screw-threaded portion 3 situated inside an inlet port 4 of the housing. The inlet bore 2 extends centrally along the axis 5 of a large diameter bore 6 in the housing 1 and emerges at an end face 7 of the bore 6. An outlet bore 8 extends level with the end face 7 into a larger diameter, screw-threaded portion 9 in an outlet port 10. The outlet bore 8 extends radially from bore 6 and emerges from the valve housing at the side thereof remote from the inlet bore 2. Bore 6 is closed by a valve member 11 which includes a cylindrical extension 12 that sealingly engages in bore 6 and fills it substantially to the level of the outlet bore 8. The valve member 11 bears on the side wall of the valve housing 1 by way of a large diameter end face 13 which projects outwardly toward the extension 12 with a slightly frusto-conical configuration.

A ball 14 is situated inside the bore 6 between the extension 12 and the end face 7 of the bore. In FIG. 1, the ball rests on a seat surface 15 provided at the end of the inlet bore 2. In this position, the ball closes off the inlet bore and one-half of the ball projects into a bored part 16 in extension 12. The bored part 16 is widened out to the diameter of the ball which is situated centrally of the axis 5 and, hence, centrally to the inlet bore 2. The depth of the bored part 16 corresponds approximately to the diameter of the ball 14, thus forming a pocket. The diameter of the ball and the diameter of the bored part 16 are adapted one to the other so that the ball 14 can sealingly penetrate into the bore 16 when the ball is released from the seat surface which seals bore 2. On the side of the ball remote from the inlet bore, there is provided a stem 17 in a bore 18 of the valve member 11. The bore 18 is adapted to the diameter of the stem 17 and disposed centrally with respect to bore 16. The stem is guided for longitudinal displacement in bore 18 with considerable clearance and bears on the ball surface by way of an end 19, the diameter of which is slightly reduced. The length of the stem end 19 is such that a shoulder 38 formed by the reduced diameter portion is situated inside the bore 18 even when the ball 14 is in a bottom dead-center position, i.e., when the ball rests on bottom seat surface 15.

The end of stem 17 which is opposite the end projecting from the bore 18 in the valve member 11 is in contact with a piston 20 that can reciprocate in a cylinder 21 and forms a single-acting piston and cylinder assembly. The cylinder has an enlarged diameter bored portion 23 centered on a collar portion 22 of the valve member 11. The bored portion 23 is not subject to the action of fluid and communicates with a radially-extending outlet aperture 24 which is formed in the cylinder 21 at a location which is level, i.e., forms an extension to the end face of collar portion 22. The bored portion 23 is sealed off by a lip seal 26 from the cylinder bore 25 which receives piston 20. The lip seal 26 is disposed in a groove in the cylinder wall and surrounds the piston. Ring seals 27 are provided in recesses in the piston 20 in the region of bore 25 which closely surrounds the piston 20 and provides a fluid-tight seal for the piston end face which is subject to the action of fluid pressure.

A cover 28 closes off the end of cylinder 21 which is remote from the valve member 11. The cover 28 includes a collar 29 that engages in the bore 25 of the cylinder and an O-ring 30 provides a fluid-tight seal to the exterior for the cylindrical bore 25. A bore 31 in cover 28 supplies pressurized fluid medium to the end of the piston which is opposite an end in which there is situated a hard metal insert 32. The insert 32 is located centrally on axis 5 to form an abutment surface for stem 17.

Four clamp bolts 33 are disposed inside the cylinder cover 28 and extend outside the cylinder circumference by passing freely through bores, not shown, in the valve housing 1. The screw-threaded ends on the clamp bolts 33 engage in tapped holes, not shown, provided in a ring 34 that closely surrounds the inlet port 4 on the side of the valve housing 1 which is opposite valve member 11.

High-pressure fluid enters the high-pressure valve in the direction of arrow 35 shown in FIG. 1 to inlet bore 2. When the ball 14 is lifted from its bottom seat 15, the fluid flows by way of the open part of bore 6 to the outlet bore 8 in the direction of arrow 36 for discharge from the valve as shown in FIG. 3. In this position, the ball 14 presses the unactuated piston 20 in response to fluid pressure acting on the ball into a top dead-center position of the piston by way of stem 17. Under these conditions, the ball 14 penetrates more deeply into the widened part 16 of the bore in the extension 12 and bears against top seat 15. As shown in FIG. 3, the ball pushes the stem and the piston 20, holding the same in the top dead-center position. During this movement which can occur within a very short time period, practically no high-pressure fluid passes into the bore used to guide the stem 17 because the ball is sealingly fitted into the widened bore 16 of the valve member 11. Any further transfer of fluid is, however, reliably prevented when the ball 14 rests on the top seat 15 and closes off the bore 16; however any fluid that has passed through can escape by way of outlet bore 24.

Pressurized fluid passing in the direction of arrow 37 at a required rhythm controlled by means, not shown, through bore 31 into cylinder cover 28 is received in the chamber of the cylinder and forces the piston back into its bottom dead-center position. During this movement, the piston 20 pushes the stem 17 and thus returns the ball 14 to its bottom seat 15 in which it closes the valve inlet bore 2.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A high-pressure ball valve comprising the combination of a valve housing having a valve bore formed with an outlet bore at the periphery thereof, said valve bore extending to an inlet bore having a seat surface facing said valve bore, a valve member including a cylindrical extension extending from a tapered and substantially frusto-conical end face, said cylindrical extension having a length to sealingly engage in said valve bore and extend to the outlet bore at the periphery thereof, said cylindrical extension further having a central bore extending to an enlarged pocket within the extended end thereof, a ball to sealingly fit in said enlarged pocket of said cylindrical extension against the central bore therein opposite the seat surface of said inlet bore, a stem received in the central bore of the cylindrical extension for displacing said ball from the pocket therein against the seat surface of said inlet bore, and a hydraulically-actuated piston for displacing said stem along the bore in said valve member.

2. The high-pressure ball valve according to claim 1 further including a cylinder extending coaxially with said cylindrical extension from a side of said valve member which is opposite said frusto-conical end face for receiving said hydraulically-actuated piston, said cylinder having a sufficient length to apply pressurized hydraulic fluid only to the side of said piston which is remote to said valve member, and means for forming an outlet aperture communicating with a chamber wherein said stem projects adjacent said valve member in said cylinder.

3. The high-pressure ball valve according to claim 2 wherein said valve member includes a collar section extending into said cylinder, and wherein said high-pressure ball valve further includes a cover to enclose the end of said cylinder for containing said pressurized hydraulic fluid, and bolts for clamping said cover against said cylinder.

4. The high-pressure ball valve according to claim 3 further including a ring supported by said valve housing to surround said inlet port, said ring including threaded bores to engage with said bolts.

5. The high-pressure ball valve according to claim 1 wherein said hydraulically-actuated piston includes a hard metal insert to engage said stem, and wherein said stem includes a reduced diameter end portion to engage said ball.

6. The high-pressure ball valve according to claim 5 wherein the length of the reduced diameter end portion of said stem extends to a shoulder such that the shoulder remains situated within said central bore when said ball is sealingly fitted against the seat surface of said inlet bore.

* * * * *